United States Patent [19]

Kolodziej

[11] 4,087,682
[45] May 2, 1978

[54] ILLUMINATING DEVICE

[76] Inventor: Henry W. Kolodziej, P.O. Box 296, Ocean Grove, N.J. 07756

[21] Appl. No.: 667,139

[22] Filed: Mar. 15, 1976

[51] Int. Cl.² ........................................... F21V 13/04
[52] U.S. Cl. ..................................... 362/297; 29/467; 29/527.5; 113/116 J; 362/348
[58] Field of Search .................. 240/41.36, 41.37, 41.3, 240/44.1, 41.1; 113/116 J; 29/464, 467, 468, 527.5

[56] References Cited

U.S. PATENT DOCUMENTS

| 1,248,456 | 12/1917 | Clark | 240/41.36 X |
|---|---|---|---|
| 1,615,358 | 1/1927 | Chubb | 240/41.36 X |
| 1,744,907 | 1/1930 | Luce | 240/41.36 X |
| 2,255,819 | 9/1941 | Salani | 240/41.36 |
| 3,511,983 | 5/1970 | Dorman | 240/41.36 X |
| 3,700,883 | 10/1972 | Donohue et al. | 240/41.36 |

Primary Examiner—Fred L. Braun
Attorney, Agent, or Firm—Victor J. Evans & Co.

[57] ABSTRACT

A method of making an illuminating device such as a flood light or vehicle headlight in which a light source is mounted in a jig including a member for adjustably supporting a plurality of selected small reflectors. Reflectors are selected, mounted in said jig and each reflector is adjusted to direct light impinging on that reflector to a selected area to be illuminated. After having selected and adjusted each small reflector, a matrix is made from the reflecting surfaces mounted in the jig and this matrix is used in a known manner to form male and female dies for forming one or more reflecting devices having facets to reflect light in the same pattern as determined by the adjustment of the selected small reflectors in the jig. The invention also contemplates reflectors made by the novel method.

5 Claims, 10 Drawing Figures

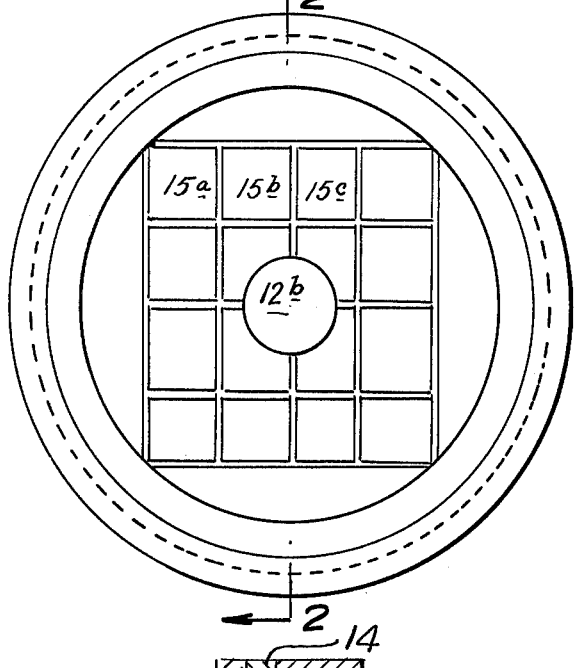
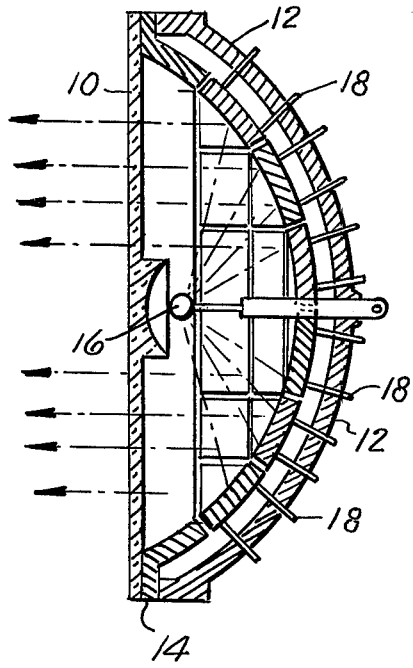
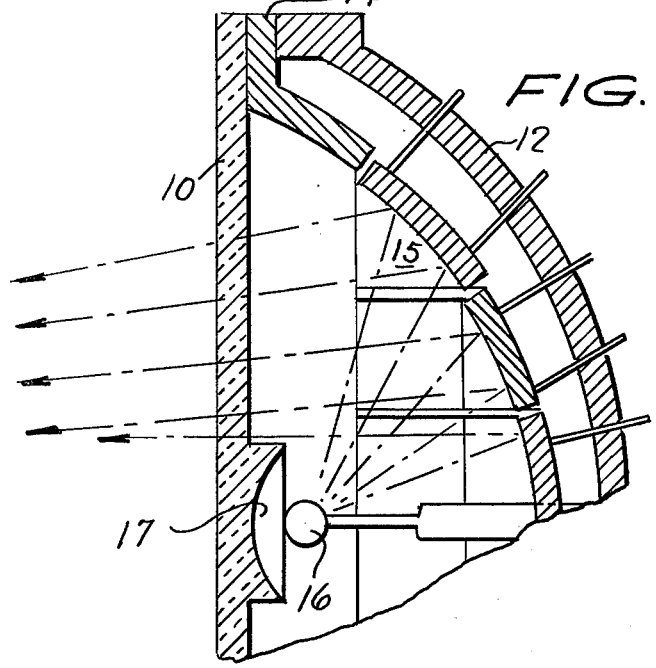
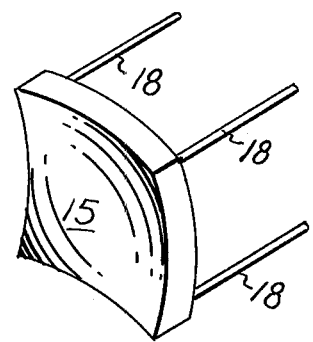

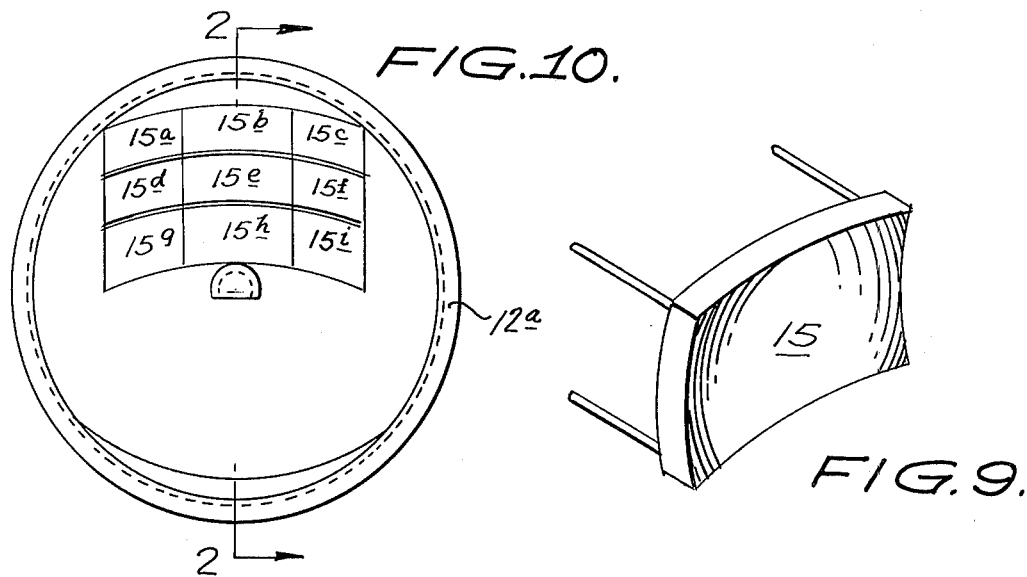
FIG. 10.
FIG. 9.
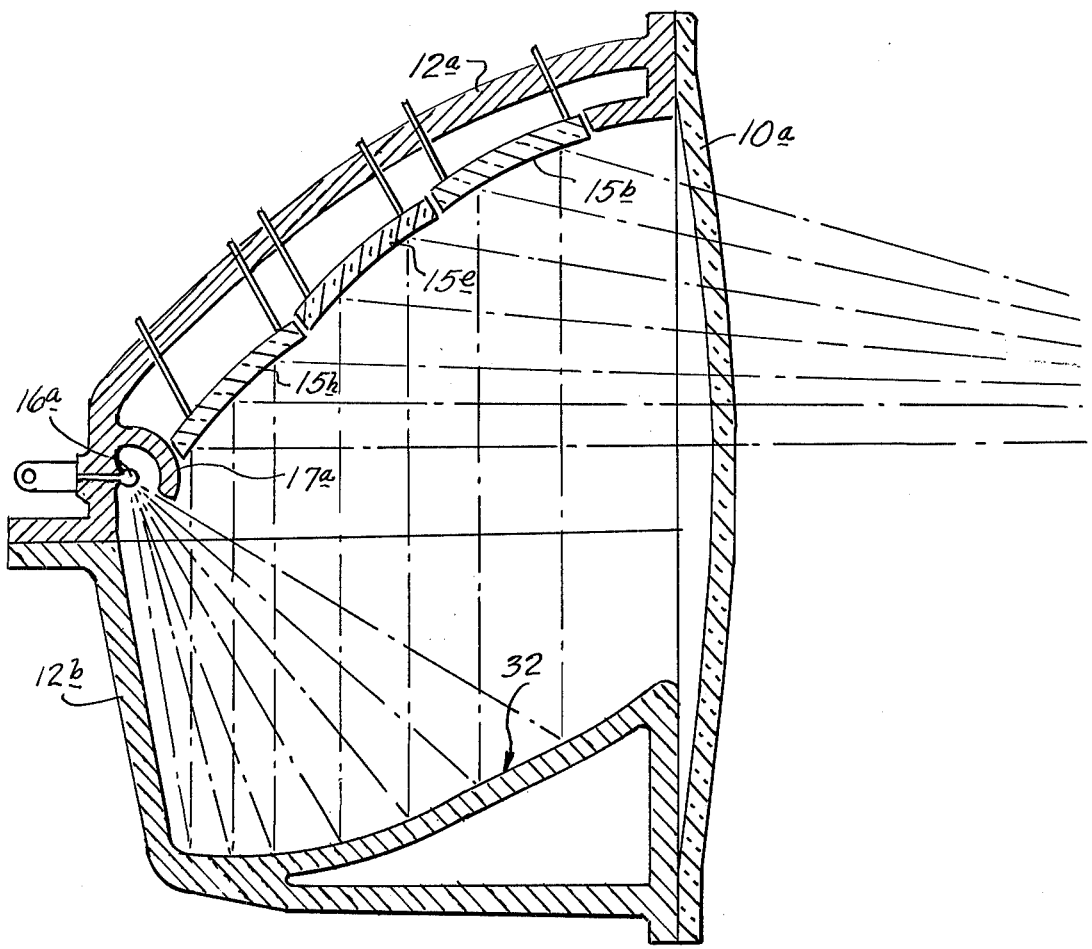
FIG. 8.

ILLUMINATING DEVICE

BACKGROUND OF THE INVENTION

FIELD OF THE INVENTION

SUMMARY OF THE INVENTION

An object of the present invention is to provide a method by which illuminating devices such as flood lights and vehicle headlights may be designed and made inexpensively and in small numbers while providing highly effective distribution of light over the area to be illuminated.

A further object of the present invention is to provide an illuminating device having the characteristic of distributing the light to satisfy predetermined requirements for illumination over an area.

Other objects and advantages will become apparent in the following specification when considered in light of the attached drawings.

BRIEF DESCRIPTION OF THE DRAWINGS

FIG. 1 is a front view of a jig and selected reflectors used in the proposed method;

FIG. 2 is a sectional side view of the jig and reflectors of FIG. 1 taken on line 2—2 of FIG. 1;

FIG. 3 is a perspective view of one reflector which may be used in the proposed method;

FIG. 4 is an enlarged section similar to FIG. 2 showing some reflectors mounted in the jig adjusted to direct the light in a predetermined pattern different from the pattern of FIG. 2;

FIG. 8 is a sectional view of a jig used to make a preferred reflecting device for a flood light or vehicle headlight;

FIG. 9 is a perspective view of a reflector element to be adjustably mounted in the jig shown in FIG. 8; and FIG. 10 is a front view of a flood light made by the method using the jig of FIG. 8.

DESCRIPTION OF THE PREFERRED EMBODIMENT

Figure 5:
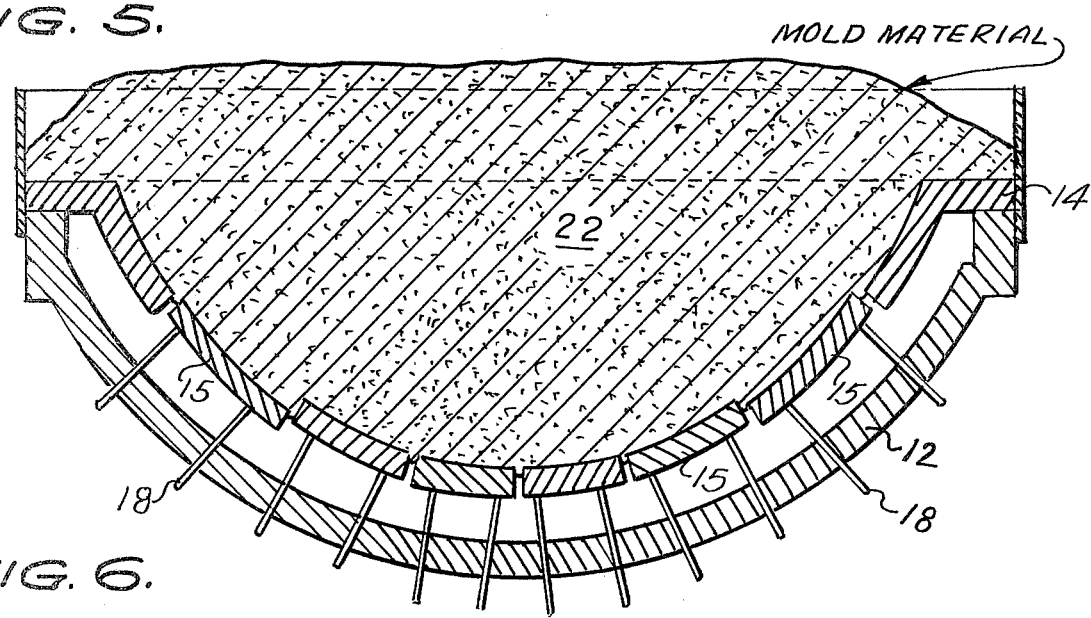
FIG. 5 is a section of the jig as adjusted in FIG. 4 being used to make a male matrix.

For simplicity of the disclosure of the method of making the novel illuminating device, FIGS. 1 through 7 are first referred to.

Designing reflectors for use in headlights and flood lights has, in the past, been very expensive because it requires complicated optical computations, so, due to the high cost of designing each reflector, it has been necessary to limit the numbers of different specific models of flood lights that could be furnished, as small production runs of specially designed reflectors would be excessively expensive. The result is that headlights and flood lights are, for the most part, provided with reflectors based on a surface of revolution which is usually a parabola or a modification of a parabola.

It is known that the light intensity from a light source is not uniform in all directions, but where most of the light from a light source is to be focused on a spot, the "parabolic" reflector is generally suitable. Where the light from the source is to be spread to cover as evenly as possible a wide area, however, the "parabolic" reflector is unsuitable and reflectors merely defining a surface of revolution cannot perform satisfactorily.

While reflectors are known that have shapes which are not surfaces of revolution such reflectors, if specifically designed for a certain use, would be unsuitable for other uses. Unless a specific design is one of wide application the design cost would, therefore, be excessive compared with a possible selling price. It is usual now to merely install whatever lights are offered for sale which results in uneven lighting and often requires an excessive number of lights. These problems are cured by the method of the present invention as explained below.

In FIG. 1 the front view of a spotlight designing jig is shown which (as seen in the section FIG. 2) includes a cover, or "lens" 10, a backing and support 12, a reflector 14 which is formed of a plurality of reflecting surface elements 15a, 15b, 15c etc. Sixteen such reflecting surface elements are seen in FIG. 1. The number and size of such elements is dependent on the size of the lighting device in which the completed reflectors are to be used.

As seen in FIGS. 2 and 4 a source of light 16 corresponding in all respects to the source of light to be used in the lighting device being designed, is mounted between lens 10 and reflector 14, 15.

Each of the reflective surface elements 15a, 15b, 15c, etc. have an appearance similar to that seen in FIG. 3. These elements may be concave, convex or flat. The reflecting element in FIG. 3 is designated as 15 as representing any of sixteen elements 15a, 15b, 15c, etc., whether of concave, convex or any other surface shape. It will be noted that a great many different elements 15 must be provided having reflective surfaces of various configurations inasmuch as in designing a reflector for one purpose the elements 15 will need to be found for each area of the reflector having a surface configuration to concentrate or disperse the light from the light source 16 falling on that specific area 15 of the reflector so that the light will contribute its share of the desired illuminating. It will be noted that an opaque element 17 prevents light from shining directly from light source 16 toward the area to be illuminated. The curved back of the element 17 reflects the light back toward source 16 and to the several reflecting elements 15 and has the effect of enlarging or intensifying the light source 16.

In FIG. 1 provision is made for sixteen elements 15 each of which must be selected to have the desired curvature of its face and be mounted so that the light falling on it will be reflected in the desired directions. The selection of curvatures of the faces of elements 15 and the angles at which they are set will need to be different for each specific pattern of light to be projected outwardly through lens 10.

The elements 15 each have three or four wires 18 extending from their rear surface, and the supporting jig 12 is provided with appropriate holes through which wires 18 will project. The surfaces of elements 15 are successively positioned by movement of the wires 18 until they are each in the position required by the design requirements of the illuminating device being made. The wires are then secured so that elements 15 are held in position so that the pattern of light from the device shown in FIG. 2 will cover the designed area to be illuminated in the manner desired.

Figure 6:
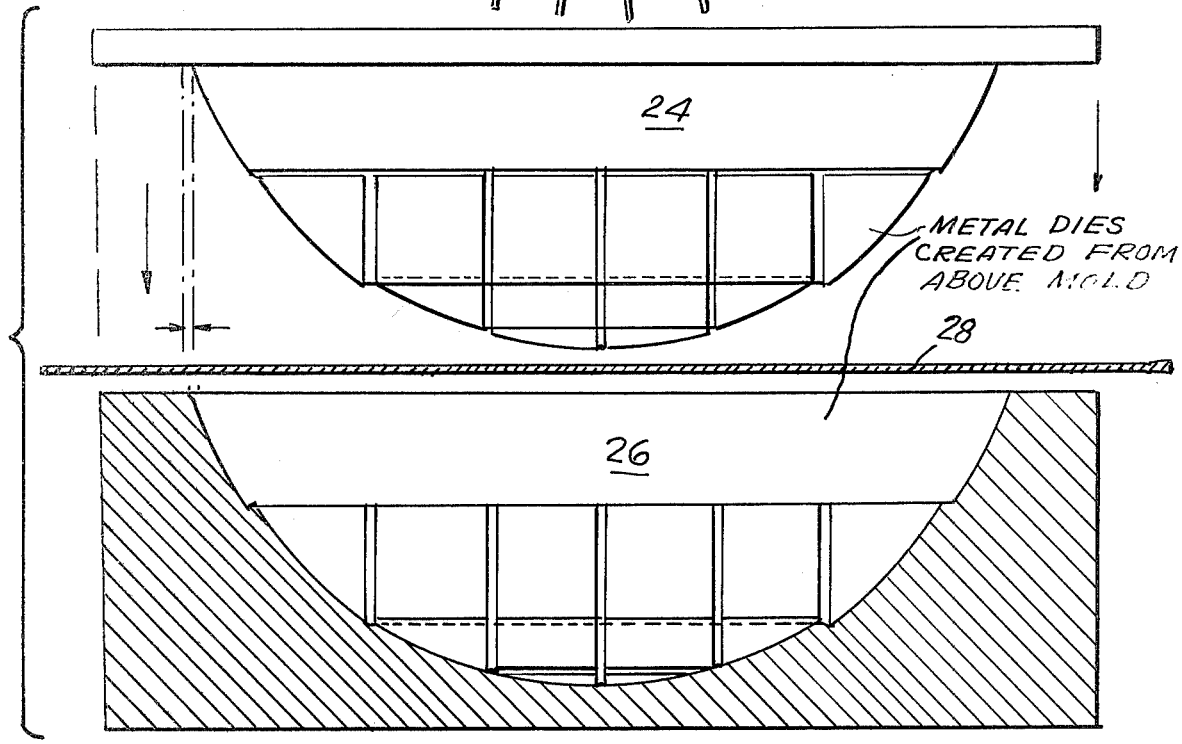
FIG. 6 is an exploded view of a male and a female die made from the jig as adjusted in FIG. 4 with a sheet of material to be formed by the dies.

Lens 10 and light source 16 are then removed, and the supporting jig 12 with the reflecting surfaces 14, 15 secured therein is mounted horizontally. A collar 20 is put in place around the elements 12 and 14 as shown in FIG. 5. Molding material 22 which may be any hardenable fluid, such as dental stone, is prepared and, using the surfaces of 14, 15 and the collar 20 as a mold, a male matrix is formed that records the exact curvature and position of each element 15. A metal male die 24 as seen in FIG. 6 is then made by known methods from the mold material 22 which has solidified and hardened in FIG. 5. The solidified element 22 may, of course, require removal of burrs occurring at the junctures of elements 15 prior to making die 24.

The male die 24, seen in FIG. 6, presents facets corresponding in surface curvature and in position to the surface curvature and positions of each element 15 which had been secured in position as mentioned above.

Figure 7:
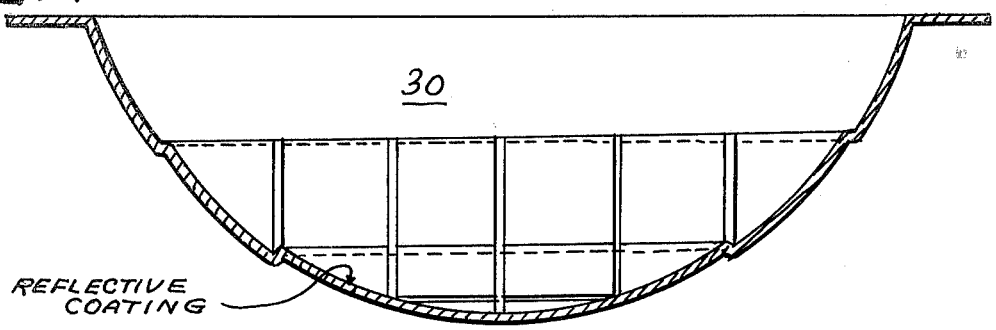
FIG. 7 is a section of a finished reflector the facets of which agree with the facets formed by the adjusted reflectors of FIG. 4.

A female die 26 is made by known methods to correspond to male die 24 so that when a sheet of material, preferably metal, 28 is placed between dies 24 and 26 and the dies pressed together, the sheet of material will be deformed into the finished reflector 30, seen in FIG. 7, the inner surface of which is provided with facets corresponding to the elements 15 as arranged in jig 12.

It will be understood from the above that it is not necessary, in designing and making reflectors for illuminating devices such as flood lights by the method of the present invention, to enter into any extensive and complicated optical computations but rather, using the jig device of FIGS. 1, 2, 3 and 4 it is only necessary to select elements 15, mount them in jig 12 and adjust each element 15 to the angle required, which is determined by observation with light source 16 providing light such as will be provided in the finished flood lights. The cost of arriving at a male matrix 22, from which the male die 24 is made, is, then, quite inexpensive thus substantially reducing the cost of the die to make the finished reflectors 30.

The device of FIG. 2, after one matrix has been made may be re-used with different arrangements of elements 15 to make other matrices for reflectors having different faceting to produce reflectors having other desired reflective characteristics.

A preferred illuminating device may be made by use of the jig shown in FIGS. 8, 9 and 10.

As seen in FIG. 8 a jig including a supporting portion 12a to support movable reflectors 15a, 15b, 15c etc. which are the same as the reflectors shown in FIGS. 1 through 5 being in this case used in a different jig, jig element 12a, is supported on a base 12b. Base 12b is formed with a reflecting surface 32. This reflecting surface may be formed originally by using the method of this invention to give as closely as possible parallel rays of light from light source 16a to shine directly upwardly. Once this reflecting surface 32 is made it will not need to be redesigned but will be incorporated in each illuminating device of the type shown in FIG. 8 regardless of the specific illuminating pattern of the completed device. Light source 16a in the jig is supported behind a baffle 17a. Baffle 17a prevents light from the source of light 16a from being projected anywhere except to the reflector 32. The need to have the rays from reflector 32 predominantly parallel, the effective size of the light source 16a plus the light reflected from baffle 17a which cannot be done with a simple parabolic mirror may require that reflector 32 be initially designed by the method of the present invention. Lens 10a encloses the jig.

As in the case of FIGS. 1 through 5, then, the jig of FIG. 8 will be assembled with a first selection of reflecting elements 15a, 15b, 15c etc. The light source will be activated and the reflecting elements 15 will be adjusted so that each reflecting element directs the light falling on it to illuminate the desired area. It may, of course be necessary to try different reflecting elements than the first selection if it is discovered, in adjusting the first selected reflecting elements, that they do not satisfy the requirements for the elements in a specific position in the reflector. This can be done easily by removing the lens, observing the unsatisfactory reflecting element and replacing it with one believed to be more satisfactory. With experience in use of the jig the selection of the best reflecting element for each portion of the reflector for illuminating a desired area will become easier.

In making illuminating devices such as suggested in FIGS. 8 through 10 the same method steps to make male and female dies are performed as in making the reflector 30 as described in connection with FIGS. 1 through 7.

It will be noted that if only a single illuminating device is required the jig as seen in FIGS. 4 or 8 could be used after the elements 15 have been adjusted and fixed in place.

It is to be noted that the jig of FIG. 8 can be used for forming casting molds to permit the illuminating device to be cast from glass or other desired material.

Having thus described the preferred embodiments of the invention it should be understood that numerous structural modifications and adaptations of the method may be resorted to without departing from the spirit of the invention.

What is claimed is:

1. A method of making a reflector for a flood light or the like comprising the steps of providing a jig, and providing a light source to shine light into said jig, providing a plurality of small reflectors having reflective surfaces of various configuration, adjustably mounting said small reflectors in said jig to receive light from said light source, adjusting said small reflectors in said jig to direct the light to the desired areas to be illuminated, removing said light source, pouring a molding material against the adjusted small reflective surfaces in said jig, forming male and female reflector forming dies from said molding material after it has aired and stamping metal reflectors having multiple reflective surfaces between said dies.

2. The method of claim 1 including the step of providing a first reflector to receive light from the light source and reflect it onto the plurality of small reflectors.

3. A jig for fashioning an illuminating device comprising a housing having a base and a supporting portion and an open area, a light source disposed in said housing substantially at an area where said base and said support portion meet, a baffle disposed in said housing at said area overlying said light source to exclude light from directly impinging on said support portion but allowing the light source to radiate upon said base, a reflector disposed upon said base in said housing having a contour which causes light from said source to be reflected from said base in parallel rays, a plurality of reflecting elements disposed in said housing on said supporting portion oriented to receive the parallel rays emanating from said reflector, each of said reflecting elements having means for adjusting the angle of orientation of said reflecting elements so that light impinging on said reflective elements may be focused as it travels outwardly from said housing through said open area.

4. The jig of claim 3 further including a lens which overlies said open area.

5. The jig of claim 3 in which said means for adjusting the angle of orientation of said reflecting elements comprises wires which connect said reflecting elements to said supporting portion.

* * * * *